United States Patent [19]

Newman

[11] 4,035,945
[45] July 19, 1977

[54] RANDOM MOTION FISH LURE APPARATUS AND METHODS

[76] Inventor: Gerald R. Newman, 78 Eventide Lane, Levittown, Pa. 19054

[21] Appl. No.: 695,313

[22] Filed: June 22, 1976

[51] Int. Cl.² .............................................. A01K 85/00
[52] U.S. Cl. .................................... 43/42.15; 43/42.53
[58] Field of Search .................. 43/42.15, 42.18, 42.53

[56] References Cited

U.S. PATENT DOCUMENTS

| | | | |
|---|---|---|---|
| 1,297,354 | 3/1919 | Jay | 43/42.15 X |
| 2,708,805 | 5/1955 | Garvie | 43/42.15 |

Primary Examiner—Robert Peshock
Assistant Examiner—Daniel J. Leach

[57] ABSTRACT

The invention is motion control apparatus for imparting random, erratic and unpredictable motion to a lure which is pulled through the water, a combination fish lure and motion control apparatus, a method of making the same and a method of establishing random, unpredictable motion for a fish lure. Universally coupled concave discs connected between the fishing line and the lure provide the erratic direction of travel and frequency of movement of natural bait, such as minnows or the like. By centrally pulling a first concave disc and edge connecting thereto a further centrally connected disc with bait edge coupled thereto, the random travel or directional change with attendant wiggling action is imparted to the fish bait. The unusual interconnection of the discs and their connections to the line and bait provide a continuously varying load center to impart the erratic motion.

8 Claims, 4 Drawing Figures

RANDOM MOTION FISH LURE APPARATUS AND METHODS

PRIOR ART

No prior art is known which utilizes concave discs with center and offset connections. In U.S. Pat. No. 1,297,354, a control attachment is disclosed using a concavo-convex apron integral with, and extending at an angle from, a surface plate for effecting a devious path through the water.

THE INVENTION

The present invention simulates the travel of bait fish while also maintaining their wiggling or swimming action. Preferably, a pair of concave discs connected together in offset fashion provides the basic motion control apparatus. Each disc is punched at two locations. The center is punched out from the outer surface to form an annular socket; and, a position adjacent the edge is punched out from the inner surface to form an oppositely disposed socket.

A first or forward disc is secured to the fishing line by a link with a ball, the ball fitting into the central socket and the link extending therethrough to draw the concave side of the disc forwardly.

A second disc is coupled to the forward disc through a link having a pair of spaced apart balls. The link penetrates the edge socket of the forward disc and is connected to a ball which seats in the edge socket to provide the pulling force transmitted to the second disc.

The other end of the link penetrates the central socket and receives a ball thereon for seating within said socket so that both discs are pulled with their concave faces forward. The lure is attached, at a ball and socket connection, to the edge socket of the second or trailing disc whereby four universal type couplings are interposed between the line and the lure. Since the forward force is no longer transmitted along a straight line to the lure, and since the discs are free to move in multiple directions relative to each other, they are erratically "filling" and "spilling" water laterally of an axis from the lure to the line. This imparts the random, erratic, unpredictable motion changes to the lure without preventing its wiggling action to provide a more efficient immitation of a natural fish food.

Alternative embodiments of the invention utilize connecting links which include sharp bends to change the drag and, consequently the action, for fast spinning or casting retrievals and minimize drag for limited action in trolling.

The invention will be better understood from a reading of the following detailed description thereof, when taken in light of the accompanying drawings wherein.

Figure 1:
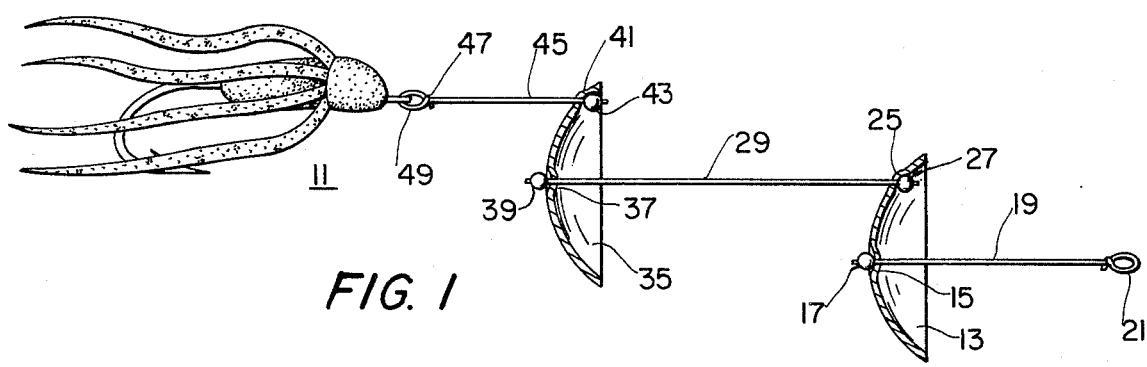
FIG. 1 is a view in side elevation of the apparatus adapted for maximum drag in spinning or casting.

In FIG. 1 an artificial type lure 11 is shown in the form of a squid but it may comprise a worm, minnow (real or artificial) or any other type spinning, casting, or trolling lure desired to be fished. The forward concave disc 13 may, for example, be of a diameter of 1 3/16 inches for average use, but, of course, the size may be increased or decreased depending upon the species being sought. It is preferably of stainless steel and inexpensively formed. The center is punched out at 15 with the punch entering from the external side to form a smooth annular socket for conforming ball 17, carried by a wire or other type link 19, in turn bearing a loop 21 for connection to the fishing line (not shown).

Near the edge of disc 13 there is a further socket 25 formed by punching from the inside of disc 13 to form a socket for receiving ball 27, carried by wire link 29.

Similarly, the second or trailing disc 35 includes a centrally punched socket 37 for ball 39, carried by link 29, and, an edge punched socket 41 for ball 43, carried by link 45, equipped with loop 47 for connection to loop 49 of the lure 11.

While the discs are depicted in vertical positions, this relative positioning changes completely when line pressure is applied to loop 21 and the discs encounter water resistance. However, the straight linkages 45, 29 and 19 are preferred for spinning or casting wherein maximum drag is desired for high action level, slow retrieval movement.

Figure 2:
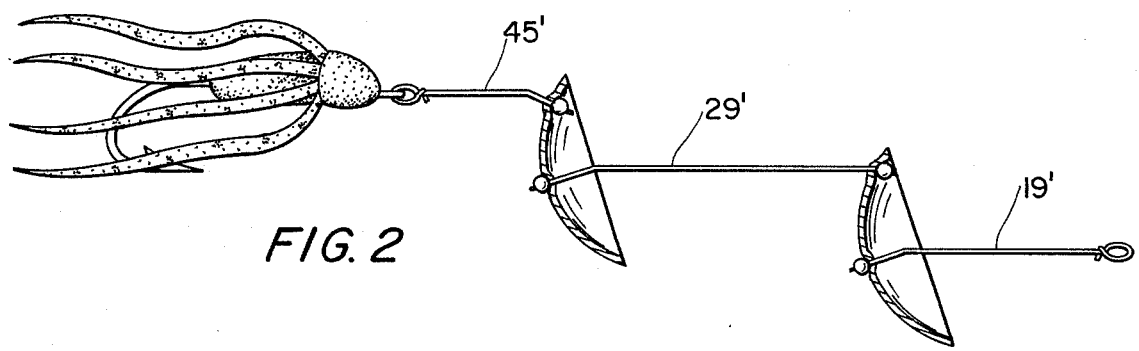
FIG. 2 shows the apparatus slightly modified in connection with the links for decreased action in spinning or casting retrieval.

In FIG. 2, the three links are modified as at 19', 29' and 45' by placing a slight uprising angle in each to adapt the apparatus of FIG. 1 for reduced drag to facilitate decreased action with fast retrieval.

Figure 3:
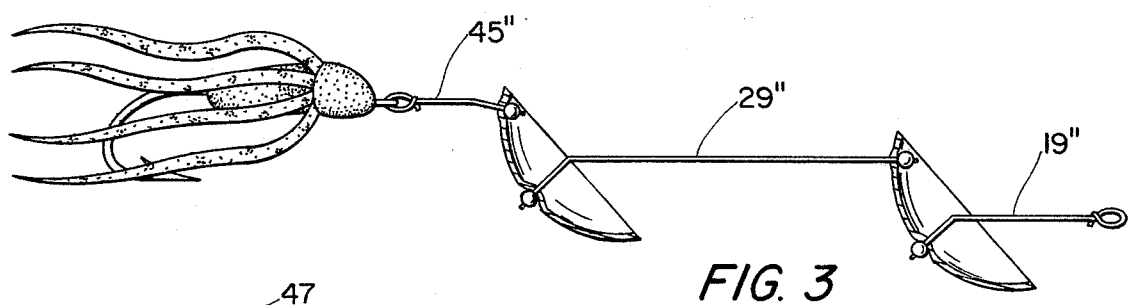
FIG. 3 is a preferred view of the apparatus for trolling.

In FIG. 3, a trolling configuration is shown wherein minimum drag and limited action are obtained. Each of links 19" and 29" includes a sharper bend therein, but link 45" remains similar to link 45'.

It will be appreciated that the discs may be likened to dishes, and as they are angled, at a greater angle to the horizontal, they provide less drag. But, of course, their movement is not as erratic or random, and hence, the apparatus of FIG. 1 is preferred.

Figure 4:
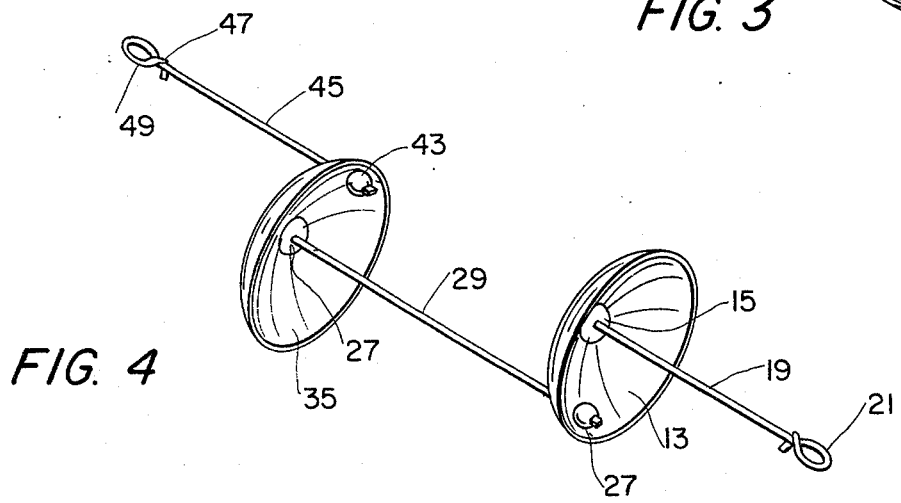
FIG. 4 is a view in perspective of the preferred control apparatus, per se, of the invention.

In FIG. 4, the combined lure is shown in perspective to better reveal construction details such as the sockets 15, 25, 37 and 41 and their relation to the balls 17, 27, 39 and 43. Other materials may be substituted such as plastics and even stiff nylon link material, but the metal, stainless steel wire link is preferred because the balls may simply be inserted on an end thereof and the wire crimped or flattened to retain the balls for the ball and socket joints. Brass is the preferred material for the balls.

It is only necessary to crimp the outer ends of links such as 29 because the ball is forced outward onto the flattened end. This flattening represents a taper onto which the ball is driven. Additional crimping is redundant due to the high pressure required to slide the ball away from the tapered end.

What is claimed is:

1. Motion control apparatus for interconnection between a fishing bait and a fishing line for imparting unique motion to the bait when drawn through the water, comprising in combination:
   a pair of concave discs;
   means for connecting the center of one disc to the line;
   means for connecting the other disc at its center to said one disc adjacent its edge; and,
   means for connecting a bait to said other disc adjacent its edge.

2. The apparatus of claim 1 wherein said one disc includes a central socket, and
   the means for connecting said one disc to the line comprises a link and ball.

3. The apparatus of claim 2 wherein said one disc includes a socket adjacent its edge and said other disc includes a center socket, and said means connecting the other disc to the one disc comprises a link and spaced apart balls.

4. The apparatus of claim 3 wherein said other disc includes a socket adjacent its edge, and said means for connecting the other disc to the bait includes a link and ball.

5. The apparatus of claim 4 wherein the center sockets of said discs extend from the outer surfaces inwardly, respectively, and said sockets adjacent the edges of said discs extend from the inner surfaces outwardly.

6. The apparatus of claim 5 wherein the respective links are flattened on each side of the balls.

7. The method of making a control apparatus for establishing random and unpredictable movement through the water of a fishing bait by employing a pair of concave discs comprising the steps of:

centrally punching each disc from the outer surface to leave an annular socket opening therethrough;

edge punching each disc from the inner surface thereof to leave an annular socket opening therethrough;

connecting the fishing line to a first one of said discs through the use of a ball for seating in the central socket thereof and a link attached to said ball and extending forwardly to the line;

connecting the other of said discs to said one disc by using a link having a pair of balls attached thereto with one ball adapted to be seated in the edge socket of said one disc and the other ball adapted to be seated in the central socket of said other disc; and, connecting the bait to said other disc by using a ball adapted to be seated in the edge socket of said other disc and a link attached to said ball and extending to said bait.

8. The method of establishing random and unpredictable motion of a fish bait through the water by employing a pair of concave shaped discs, comprising the steps of:

centrally connecting one of said discs to the line through universal coupling;

universally coupling the other of said discs through its center to an edge of said first disc; and, universally edge coupling the bait to said other disc.

* * * * *